US008594979B2

(12) United States Patent
Icove et al.

(10) Patent No.: US 8,594,979 B2
(45) Date of Patent: Nov. 26, 2013

(54) HANDHELD AND IMBEDDED DEVICES TO DETECT STICKY DEVICES USING MAGNETS

(75) Inventors: David J. Icove, Knoxville, TN (US); Carl T. Lyster, Knoxville, TN (US)

(73) Assignee: Icove and Associates, LLC, Knoxville, TN (US)

( * ) Notice: Subject to any disclaimer, the term of this patent is extended or adjusted under 35 U.S.C. 154(b) by 211 days.

(21) Appl. No.: 13/006,023

(22) Filed: Jan. 13, 2011

(65) Prior Publication Data

US 2012/0185214 A1 Jul. 19, 2012

(51) Int. Cl.
*G06F 19/00* (2011.01)
*G08B 21/00* (2006.01)
*G01V 3/08* (2006.01)

(52) U.S. Cl.
USPC ........ 702/189; 73/866.5; 324/207.2; 359/871

(58) Field of Classification Search
USPC ................ 702/189; 324/207.2, 244, 253, 326
See application file for complete search history.

(56) References Cited

U.S. PATENT DOCUMENTS

| 4,100,491 | A | | 7/1978 | Newman, Jr. | |
|---|---|---|---|---|---|
| 4,859,944 | A | * | 8/1989 | Webb | 324/253 |
| 5,491,475 | A | * | 2/1996 | Rouse et al. | 340/933 |
| 5,959,792 | A | * | 9/1999 | Ibrahim | 359/872 |
| 6,342,845 | B1 | | 1/2002 | Hilliard | |
| 6,611,210 | B2 | * | 8/2003 | Hilliard et al. | 340/941 |

(Continued)

FOREIGN PATENT DOCUMENTS

| GB | 2248692 A | * | 4/1992 |
|---|---|---|---|
| WO | WO 2005012054 A1 | * | 2/2005 |

OTHER PUBLICATIONS

Woodaman et al., "A Decision Analytic Approach for Measuring the Value of Counter-IED Solutions at the Joint Improvised Explosive Device Defeat Organization," George Mason University, 2009, 8 pages.

(Continued)

*Primary Examiner* — Andrew Schecter
*Assistant Examiner* — Terence Stifter, Jr.
(74) *Attorney, Agent, or Firm* — Cameron LLP (57) ABSTRACT

Apparatus and methods for detecting concealed personal security threats may comprise conventional mirrors and less conventional arrays of Hall-effect sensors, soft iron cores, magnetometers and the like, preferably at least two axis sensors. The concealed personal security threats may comprise, for example, sticky devices consisting of geographic position sensors for covertly broadcasting motor vehicle location data, of so-called Improvised Explosive Devices (IED's) which may be covertly or openly affixed to, for example, the undercarriages of motor vehicles using strong magnets and later exploded, the former giving away private location information without the knowledge of a driver or passengers and the latter causing damage to the motor vehicles to which they are affixed and potentially harming a driver, passengers and nearby persons and sticky containers for hiding items among other sticky devices. A sticky container may be used to contain, for example, a vehicle ignition key or contraband. Magnetic fields detected by, for example, arrays of Hall-effect sensors, soft iron cores, magnetometers and the like may be quantified and stored in processor memory as a vehicle magnetic field signature. A processor receiving magnetic field data collected by the arrays may retrieve and subtract known signatures from newly acquired magnetic field data for a given vehicle to obtain location for a magnetic field on the vehicle that may be of potential interest as a harm risk and for personal security.

11 Claims, 11 Drawing Sheets

(56) References Cited

U.S. PATENT DOCUMENTS

| | | | |
|---|---|---|---|
| 6,771,064 B2 | 8/2004 | Leibowitz | |
| 6,853,194 B2 | 2/2005 | Nelson | |
| 7,227,466 B2 | 6/2007 | Nelson | |
| 7,584,673 B2* | 9/2009 | Shimizu | 73/862.333 |
| 7,639,178 B1* | 12/2009 | Mulbrook et al. | 342/146 |
| 2008/0292211 A1* | 11/2008 | Frantz | 382/284 |
| 2010/0102809 A1* | 4/2010 | May | 324/244 |

OTHER PUBLICATIONS

Ramsden, Edward; Hall-Effect Sensors; Theory and Applications; Elsevier; 2006; excerpts, 13 pages.

Mims III, Forrest M., Electronic Sensor Circuits & Projects, vol. III, The Hall Effect, pp. 68-96, Master Publishing Inc., 2007.

* cited by examiner

500 — SENSOR-EQUIPPED SOFT CLOTH STRIPS FOR SCANNING TOP OF VEHICLE

HANDHELD AND IMBEDDED DEVICES TO DETECT STICKY DEVICES USING MAGNETS

TECHNICAL FIELD

Embodiments relate to the technical field of apparatus and methods for detecting concealed personal security threats, for example, sticky devices consisting of geographic position sensors for covertly broadcasting motor vehicle location data and of so-called Improvised Explosive Devices (IED's) which may be covertly or openly affixed to, for example, the undercarriages of motor vehicles using strong magnets and later exploded, the former giving away private location information without the knowledge of a driver or passengers and the latter causing damage to the motor vehicles to which they are affixed and potentially harming a driver, passengers and nearby persons, and, in particular, for detecting a magnetic field surrounding the sticky devices.

BACKGROUND

The situation of living and operating in a free nation in which covert activities may invade upon personal privacy and, at the same time, a hostile national environment during high terror risk or wartime conditions creates an environment where, for example, vehicles become an available target for espionage and surveillance activists, for terrorists and for insurgents to typically place magnetically affixed location finders and even bombs to motor vehicle undercarriages, bumpers, wheel wells and quarter panels. Due to their affinity to strong magnetic adherence to these metal parts, the bomb devices are called "sticky IEDs." The location trackers with associated Global Positioning System radio frequency broadcast are called "sticky location finders." Also, containers are often used with magnets to permit the containers to be concealed under the vehicle body or in wheel wells. For example, small containers with affixed permanent magnets are used to contain a vehicle ignition/lock key so that a driver, not having the key and the vehicle being locked, may, knowing the location of the container, obtain the key and drive the vehicle. Other containers using magnets may be used to contain illegal drugs, contraband, valuable documents, money and the like. Such a device may be referred to herein as a "sticky container." Other "sticky" devices may come to mind to one of ordinary skill in the art.

Sticky devices have been known to exist since at least the year 2000 and their use has been increasing. Rigged with magnets so that they will adhere to the undersides of automobiles and armored vehicles, sticky IEDs are often detonated by remote control or with timers. Consequently, sticky IED's (and also sticky location finders) may be covertly placed at one point in time, and activated once the car is moved. The sticky IED's then may be guaranteed to have at least one victim operating the vehicle. According to sources quoted on Dec. 3, 2010 via National Public Radio, currently 100 IED's are detonated each month in Iraq. The number previously was at 50 per month. In the month of November, 2010, the number of sticky IED's was 45. According to Ahmed Mawla, an explosives disposal instructor in Iraq, during the most painful times in Iraq, the number of IED's detonated reached fifty per day. Also, as of December, 2010, National Public Radio alleges that as many as 2196 deaths of US service members are attributable to IED's.

The sticky location finder is activated and can continuously monitor and broadcast vehicle location data as the vehicle moves in real time via radio frequency channels. Other initiation devices consist of movement detection mechanisms that activate the GPS unit (to save battery) or to destroy the targeted vehicle when it is started and then moved. Magnetic components of sticky IED's, sticky location finders and sticky containers may consist of imported components including, more importantly variable magnetic field characteristics and alloy compositions, for example, ceramic magnets versus AlNiCo versus SmCo versus NdFe or other permanent magnets of different alloy compositions and percentage weights.

Sticky containers may be used by rental car companies to hide keys to vehicles left on city streets for use by drivers needing vehicles that are available for rent by the hour or day. A car owner may use a sticky container to hide a key so that a co-owner, knowing the location may find the key and use it. At times, such intended placement of a magnetic container at a particular location may become unknown just as it may be the intention to use a sticky container to intentionally hide, for example, illegal drugs. Consequently, there may be a need for a magnetic field sensor for detecting such sticky containers.

Figure 1A:
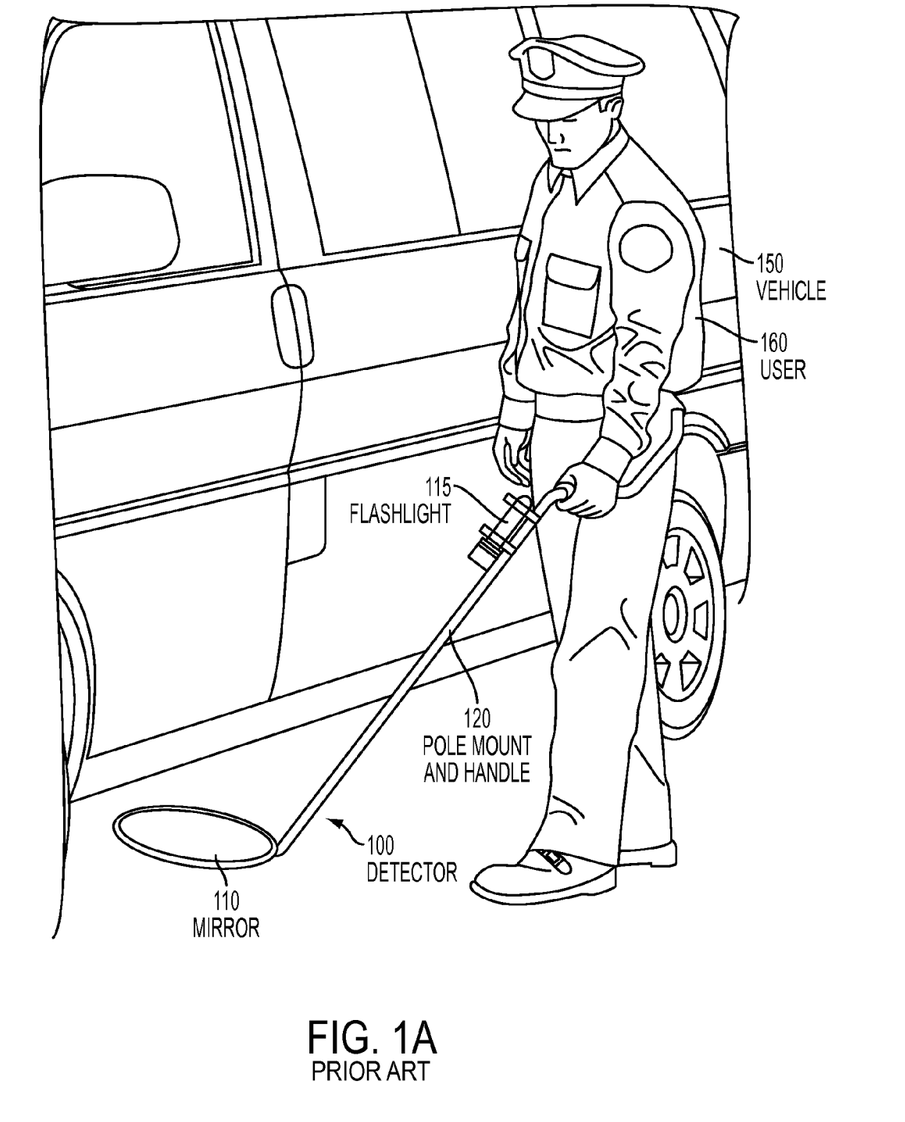
FIG. 1A shows a line drawing of a user of a pole-mounted mirror for manually determining whether the undercarriage of a vehicle 150 exhibits unusual characteristics from a visual observation.
Figure 1B:
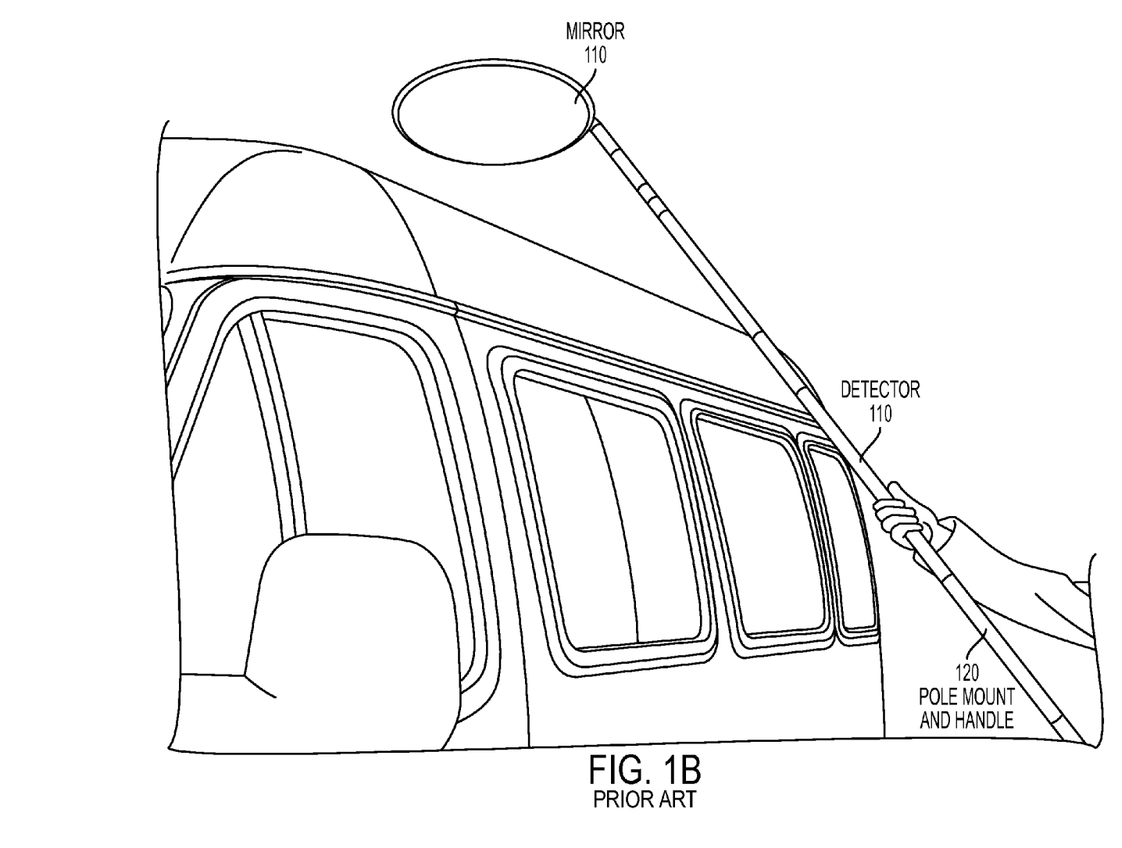
FIG. 1B shows a similar line drawing of a pole-mounted mirror for visually observing the roof of a vehicle such as a panel van or other truck which is taller than the user.

The responsibility for detecting/knowing location of these sticky devices typically rests, first, with the vehicle driver or owner. When vehicles enter compounds, security personnel typically use mirrors to examine undercarriages and other metal portions of motor vehicles. Referring to FIG. 1A, there is shown a drawing of a mirror detector 100 held by a user 160. The detector may comprise in combination a flashlight 115 for shining on a mirror 110 in order to illuminate an undercarriage of a vehicle 150. Detector 100 typically is formed as a pole mirror mount and handle 120 so that user 160 may twist and maneuver the mirror to visually identify any unusual devices that may be affixed to the undercarriage. In order to view above a vehicle and with reference to FIG. 1B, a detector 110 may have a mirror 110 carried across a top of a vehicle as the vehicle drives through a security check point by a pole mount and handle 120. These methods of vehicle examination are not infallible since they rely on human discretion to look for, identify, and remove these devices. Most of these sticky devices are camouflaged so as to not be easily seen, for example, by using black surface paint, tar, undercoating and other materials so as to blend in with the car surface. Consequently, mirrors 110 are not perfectly effective.

Carl V. Nelson et al. for Johns Hopkins University has performed research in the field of detecting an identifying metal targets. U.S. Pat. No. 6,853,194 describes an electromagnetic target discriminator sensor system and method for detecting and identifying metal targets. A prior art system describe by FIG. 1 suggests a pulse transmitter and receiver coil for determining the existence of a metal target by inducing an eddy current in the target. Such a system has an obvious disadvantage in that, by inducing a current (or voltage), a user of the depicted detector may trigger a target device to actuate and have disastrous consequences for the user of the equipment. Nevertheless, Nelson persists in utilizing a wireloop transmitter and a wireloop receiver for, for example, detecting a buried metal target bomb in his '184 patent disclosure and drawings. U.S. Pat. No. 7,227,466 describes the use of an expendable metal detector that may be in the form of a hand-thrown or guided missile that may be launched toward an improvised explosive device (IED). Once the device lands, the tip may be buried next to the IED and magnetometers actuated. The missile tip may contain an impact switch for activating first and second magnetometers spaced from one another in the missile. In this manner, the magnetic fields detected by the magnetometers may be differentiated at a difference amplifier and the result transmitted by telemetry to a decision station. Clearly, the use of a missile with differential analysis may help to locate the sticky device while preserving the safety of deploying personnel.

In the field of automobile detection and identification, it is known to obtain and compare am induction signature of a motor vehicle with a stored induction signature and so identify the motor vehicle from U.S. Pat. Nos. 6,342,845 of Hilliard et al. and 7,771,064 of Leibowitz et al. A plurality of successive induction measurements or an induction signature for a given vehicle passively captured as the vehicle passes over a blade sensor in a lane of a road may classify the vehicle (for example, as a truck or car) and even identify the vehicle. Typically, the entire vehicle passes over the blade sensor which may be buried in a road surface. As the vehicle passes over the blade sensor, the signature is captured over the time it takes for the vehicle to pass over the blade sensor.

In the field of automotive vehicle maintenance (including flying vehicles such as helicopters), it is known from U.S. Pat. No. 4,100,491 to provide a soft iron core pole piece which may be magnetized by a magnetic field. The magnetized soft iron core causes engine oil particles of the engine to adhere to the polarized magnet. As engine particles accumulate on a probe portion for mounting in an engine oil flow line, an electronic control circuit identifies the accumulation of engine particles in oil (dirty oil) and provides a green (clean oil), yellow (oil caution) and red (dirty oil) indication to a driver or one responsible for engine maintenance. A feature of the circuit is the application of a brief alternating current to the soft iron core to remove residual magnetism (make the indicator green again), for example, after the engine oil is changed.

Furthermore, besides magnetometers and soft iron core detection circuits, Hall-effect sensors are known for use, for example, in determining the angular velocity of engines by detecting a magnetic field with each turn of an engine shaft. Edward Ramson, in his book, *Hall-Effect Sensors*, Elssevier, 2006, provides a thorough explanation of the use of Hall-effect sensors. Ramsom includes chapters providing exemplary linear Hall-effect sensor circuits for, for example, head-on sensing of magnets. However, Ramson explains that Hall-effect sensors are notoriously variable in terms of their magnetic field detection characteristics. A typical remnant induction or flux density B present in a closed ring in a saturated state for a typical ceramic magnetic may be 3850 gauss. For an AlNiCo magnet, a range in B may be from 8200 to 12,800 gauss and for NdFeB up to 13,500 gauss. Hall-effect sensors are on/off binary devices operative at a relatively high sensor on point and to turn off at a relatively low level of gauss. Magnetic field strength diminishes with the square of the distance. So the closer any magnetic field detector is to a magnet, the more likely the detector will turn on. Temperature also impacts both the residual level of gauss in a permanent magnet and also impacts the characteristics of the field detector.

Other devices are known such as chromatic cameras for detecting small differences in color variation, Moreover, radio frequency transmission detectors (typically involving wide band antennae covering a large range of frequencies may be utilized to detect radio frequency transmission from either a location finder device or emanating from a poorly shielded radio frequency receiver used to detonate a sticky IED.

In view of the above, there is clearly a need in the art for improved systems and methods for detecting the presence of sticky devices, for example, of the GPS or IED type so that they may be safely deactivated and removed from the vehicles on which they are found.

SUMMARY

Specific example embodiments of apparatus and methods disclosed provide for an instrument to assist in the inspection of concealed security threats consisting of magnetized improvised explosive devices, known as sticky IEDs, which cling to the undersides of motor vehicles, sticky GPS devices used for surveillance purposes and sticky containers. IED devices are typically placed by insurgents and terrorists whose mission is to kill, maim, or terrorize the passengers and nearby individuals. The same or variations on specific example embodiments, according to the present disclosure, may also be used to detect other types of magnetically affixed devices, including global positioning systems used to surreptitiously track the vehicle, illegal substances, embargoed materials, hazardous chemicals and materials, and hazardous chemical vapors or materials. In addition, this instrument can also be used to search within any contained space, such as railroad boxcars, aircraft passenger, cargo, and luggage compartments, liquid cargo containers such as tank cars, tractor trailers, ships, and storage tanks. Embodiments may preferably involve the use of passive reception of energy of any kind to avoid inadvertent actuation or detonation. Active transmission of energy is preferably avoided, even light energy. Nevertheless, one embodiment may involve a known mirror system per FIG. 1 modified to further include magnetic field sensors, optical chromatic scanning and passive radio frequency reception in combinations selected for the application.

A method for inspecting these vehicles may consist of an embodiment consisting of various arrangements of Hall-effect sensor devices having one or more axes as explained further below. Hall-effect sensors are transducers that will vary its output voltage in response to changes in magnetic field. Hall sensors are used for proximity switching, positioning, speed detection, and current sensing applications. A preferable Hall-effect sensor is one of the linear output type where the output varies linearly with the input. The Hall-effect sensor may operate as an analogue transducer, directly returning a voltage. Digital binary to analog converters are used with, for example, a plurality of Hall-effect sensors operative at different sensed values of magnetic field in gauss to provide the analog output. With a known magnetic field, its distance from the singular Hall sensor plate can be determined by the square of the distance equation in combination with distance calculations, for example, made from automatic camera focusing optical systems. When using groups of sensors operating at different Gaussian ranges and environmental temperatures, the relative position of the magnet can also be deduced.

A disadvantage of a Hall-effect transducer is that, in its simplest form, it is sensitive to a magnetic field in only one axis. On the other hand, Hall-effect transducers may be fabricated to be sensitive as a two-axis or three-axis sensor. For example, one may place a pair of devices on a single silicon die by aligning their structures at 90° to one another for a two-axis sensor. In a similar manner, three transducers on a single die may form a three-axis sensor.

Extremely strong magnets are needed to conform with the sticky IED, container or location finder devices and quickly cause it to adhere to a surface on the vehicle. A common form of magnet used to affix sticky IEDs is known as an Alnico magnet, which consists of an iron alloy combined with aluminum (Al), nickel (Ni) and cobalt (Co), copper, and sometimes titanium. Alnico magnets produce magnetic field strength at their poles as high as 1500 gauss (0.15 tesla), or about 3000 times the strength of Earth's magnetic field. Anisotropic alloys generally have greater magnetic capacity in a preferred orientation than isotropic types. Alnico's remanence (Br) may exceed 12,000 G (1.2 T), producing a strong magnetic flux in closed magnetic circuit. Other permanent magnets are known for use in sticky devices including, but not limited to, ceramic magnets, SmCo magnets and NdFe magnets.

Forensically, it is possible to track the source of a sticky device if recovered, even if recovered in pieces, from the composition of the magnet. A recovered portion of a magnet may be reverse-engineered to determine its original size, its Gaussian output, its metallic or ceramic composition and from these factors, its origin or location of manufacture.

These and other features of embodiments of a hand-held and/or embedded device for detecting sticky devices with minimal harm to the user will be discussed herein with reference to the drawings and the following detailed description thereof.

BRIEF DESCRIPTION OF THE DRAWINGS

FIG. 8 represents a simple diode circuit for use with the circuit of FIG. 7 whereby the Hall-effect sensor 705 is now represented as Hall switch 805 for operating, for example, a light emitting diode $D_1$ to signal the presence of a magnetic field when the switch is switched on.

FIG. 10 represents a schematic block diagram of a magnetic field sensor system having a plurality of means for detecting a magnetic field including but not limited to radio frequency detection for detecting transmissions to/from a sticky device, a, for example, black scale chromatic camera for detecting color distinctions in a typically black vehicle undercarriage that may indicate the presence of a sticky device, a road mounted sensor or surrounding coil similar to that depicted in FIG. 4 plus soft cloth strips for the top per FIG. 5, magnetometers, a light source, if required, for the camera and a typical mirror per FIG. 1 or 2; a processor may maintain known vehicle magnetic signatures in memory and processor received data and display an output indicating a possible magnetic field of potential concern on a display.

DETAILED DESCRIPTION

Referring now to the drawings FIGS. 2-5, the details of specific example embodiments are schematically illustrated. Thereafter, potential circuits are shown in FIGS. 6-9 which may comprise novel arrangements for detecting the presence of a magnetic field of potential concern and displaying an output reflecting same. Finally, FIG. 10 provides a schematic block diagram of a magnetic field sensor system which may utilize a plurality of different means for detecting a magnetic field of potential concern and discriminating a sensed field from expected magnetic fields by storage and comparison with known magnetic vehicle signatures. These embodiments are not intended to be limiting and may be mixed into various embodiments according to specific applications, for example, at entrances to buildings, border crossings and hand-held sensors that may be used by vehicle users.

Figure 2A:
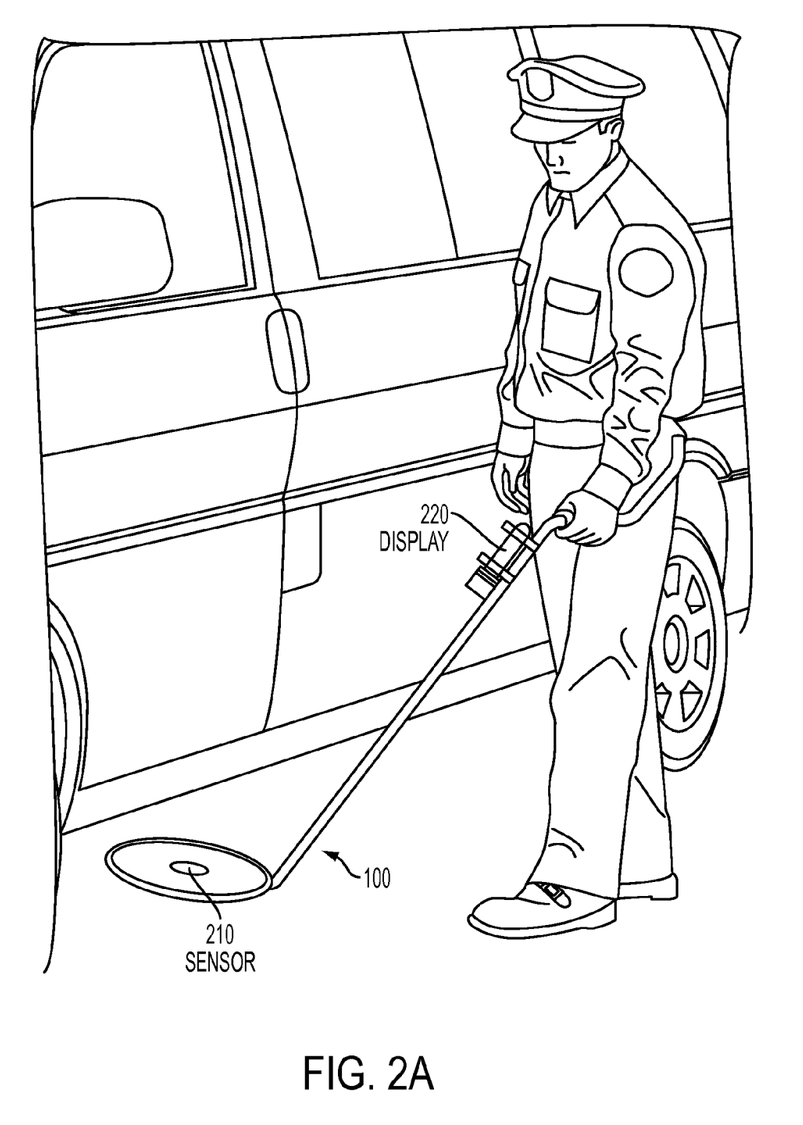
FIG. 2A shows a line drawing similar to that of FIG. 1A to show a pole-mounted mirror that may be retrofitted to incorporate one or more magnet detectors or sensors 210 which may report the presence and location of a magnetic field to a display portion 220 mounted on the pole.
Figure 2B:
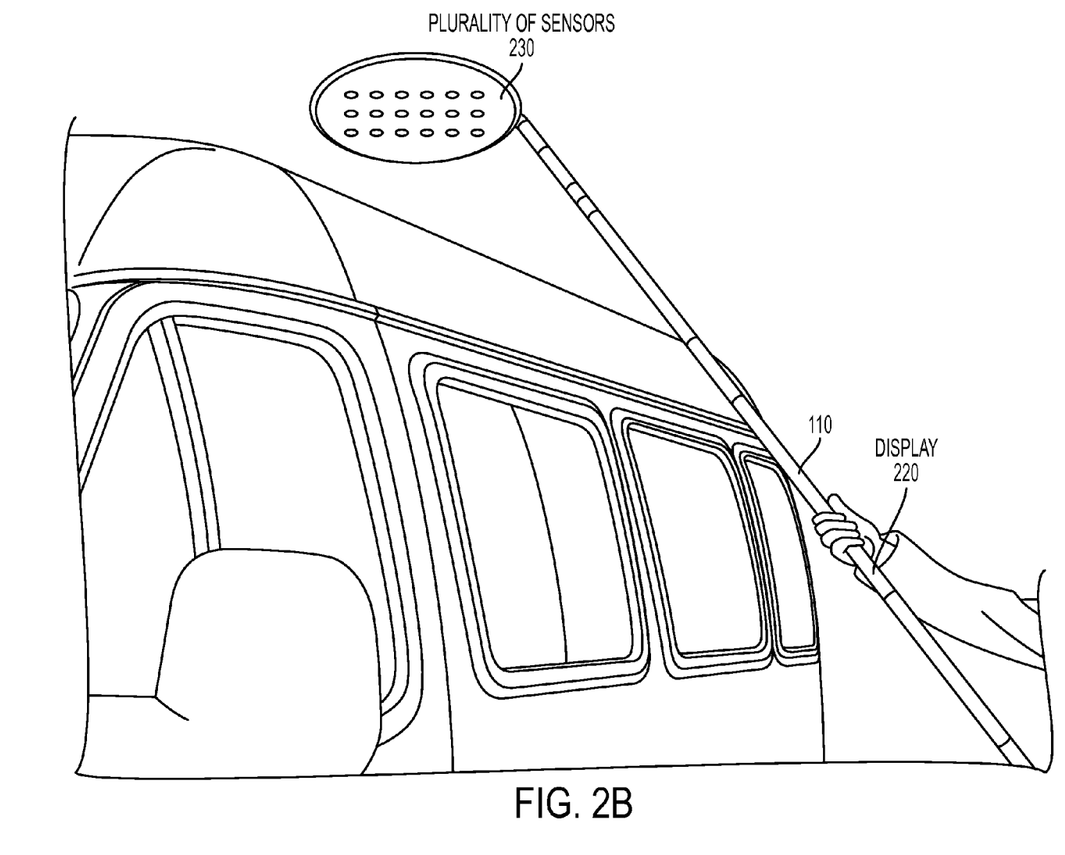
FIG. 2B shows a line drawing similar to that of FIG. 1B to show a pole-mounted mirror retrofitted to incorporate a plurality of magnet detectors or sensors for cooperation in reporting a magnet detected on the roof of a vehicle via a display.

Referring to FIGS. 2A and 2B, there is depicted a handheld mirror assembly 100 (for viewing underneath a vehicle) and 110 (for viewing the top of a vehicle) with a circular mirror on the end of a handheld rod or pole in which, for example, a Hall-effect sensor or plurality of Hall-effect sensors may be imbedded behind the center of the mirror. Per FIG. 2A, a typical mirror pole assembly is retrofitted to comprises at least one magnetic field sensor 210 shown as a circle inside the circular mirror per one of FIGS. 6-10 which, when actuated, causes a display 220 to indicate the presence of a magnetic field. Preferably, the one magnetic field sensor 210 is at least a two-axis Hall-effect or other sensor with structures at 90° rotation to one another on a single die so as to be able to measure any magnetic field to which it becomes proximate. Embodiments of Hall-effect sensors preferred in any of the depicted embodiments are two-axis sensors. During a visual inspection of the undercarriage of the vehicle or other area, a positive reading of the sensor voltage in one or the other or both axes may indicate the presence of a magnet, prompting a closer examination. The traditional flashlight and mirror may be used in the indicated site of the magnetic field to a user who may be a security officer or a vehicle user. These may be scanning the vehicle before the vehicle is moved.

According to FIG. 2B, there are shown a plurality of sensors 230 behind a mirror for viewing the roof or cargo area of a vehicle and obtaining an indication of a magnetic field of potential concern at an identified area of concern per the display 220 in combination with the known mirror pole assembly. While it is believed that magnetic devices may be more commonly affixed to sides and bottoms of vehicles, location identifying devices may be found adhering to the not typically visible roofs of vehicles.

Consequently, FIGS. 2A and 2B depict embodiments of the handheld mirror of FIG. 1 where an array of Hall-effect sensors 230 are imbedded behind the surface of the mirror and demonstrate that an embodiment of FIG. 1 may be retrofitted to incorporate magnetic field sensing. Sensor arrays 230, such as shown in FIG. 2B may illuminate a panel or display 220 consisting of light emitting diodes (LEDs) or other visual screen display on which the shape of the magnet may be shown within the array of LED's and thus located (when the magnetic device might not otherwise be easily seen). During a visual inspection of the undercarriage of the vehicle or other area, a positive reading of the sensor voltages may indicate the shaped presence of a magnet, prompting a closer examination, deactivation or removal of the device or, at least immediate movement of the vehicle to a safer location for professional removal.

Figure 3:
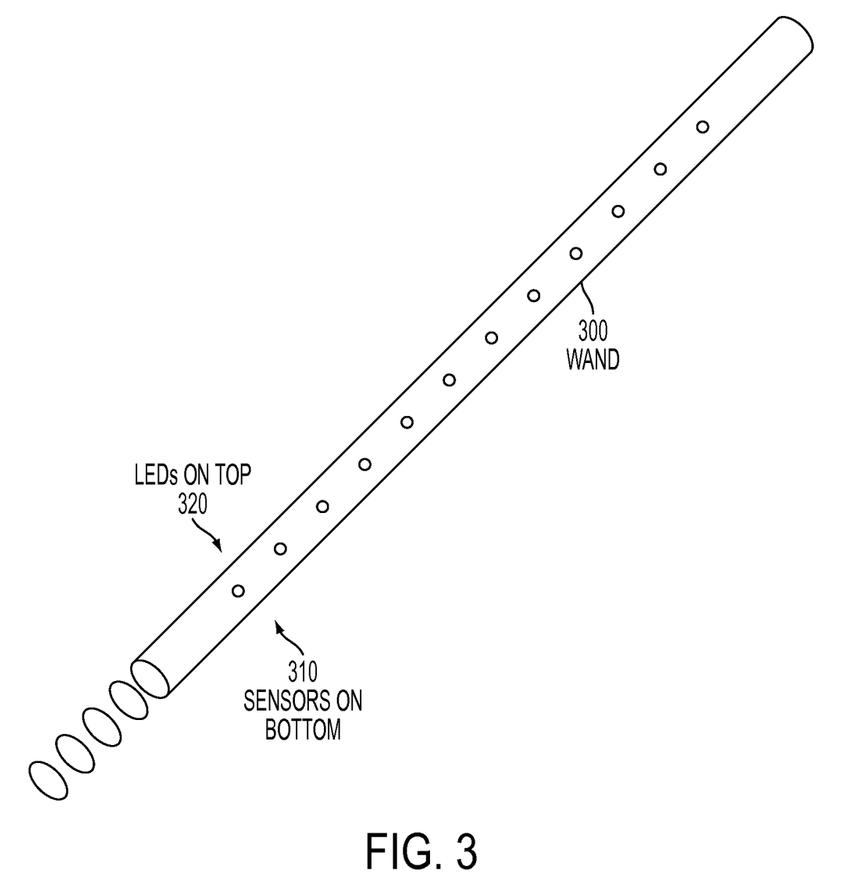
FIG. 3 shows a line drawing of a wand embodiment of a magnet detector that may be used to pass under, over and around a vehicle to detect magnetic fields having detectors on one side, for example, Hall-effect sensor circuits or other circuits as will be discussed further herein, and associated light emitting diodes that are actuated when a magnetic field sensor is activated so that the user may visibly see an outline of a detected magnetic field. Preferably, Hall-effect transducers having a two or more axis sensing feature are used in the magnetic field sensors.

Referring to FIG. 3, there is depicted an embodiment of a handheld device consisting of a wand in which a linear array of, for example, linear Hall-effect sensors (preferably at least two axis sensors) are embedded on a wand surface 310 facing the object to be inspected. On the top of the wand, LED's 320 or other visual screen displays may directly correspond to the location of the Hall-effect sensors 310. The operator of the wand device 300 may move the wand along a surface of a suspect vehicle where a sticky IED, container or location finder may be affixed to an inside (or outside) surface of the vehicle may actuate the sensors and vary the intensity of the LED's as the sensor becomes closer to the magnetic field, thus showing the outline of a magnet affixed to an explosive device or location finder.

The handheld wand 300 of FIG. 3 may also be used to assess the presence of magnetic materials in post-blast detonation of IED's to determine if the debris in a field area contains remnant portions of a magnet from a sticky IED. This material could be more easily collected without contamination. Furthermore, once recovered, the piece of magnet may be forensically analyzed for its original composition, for example, AlNiCo or ceramic, its original size, its original properties and potentially its original source or manufacturer may be identified.

Figure 4:
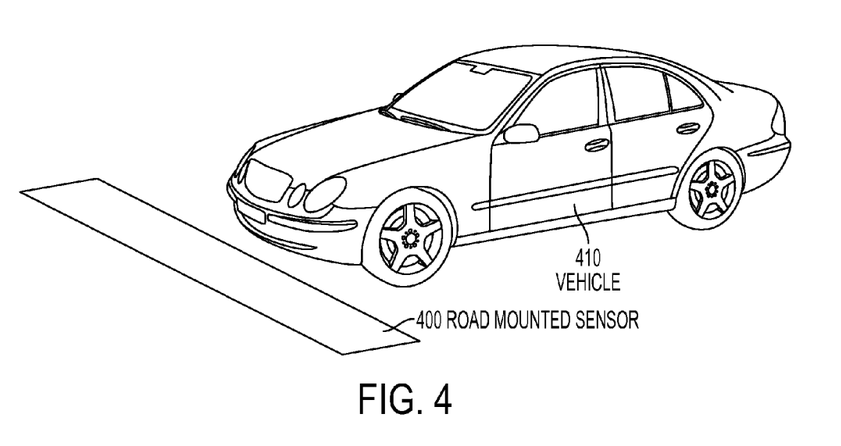
FIG. 4 represents a line drawing of a vehicle passing over a road mounted band sensor, the sensor for passively detecting the presence of a magnetic field and operating a display, not shown, for signaling the presence of a magnetic field, different vehicles having different magnetic field signatures, a stored magnetic field signature may be subtracted from a sensed signature and the display show a magnetic field of potential concern.

Referring to FIG. 4, depicted is an embodiment of a road mounted magnetic field sensor device 400 consisting of a linear array of Hall-effect sensors or other magnetic field sensor such as a soft iron core and associated coil. As discussed above, preferably at least two-axis Hall-effect sensors are used to form the linear array. The linear sensor array may be embedded on the surface facing upwards under the object or vehicle 410 to be inspected, for example, at a border crossing or building entrance. The array can be permanently affixed to the pavement or on a flexible and durable strip that can be temporarily affixed. As will be further described herein, known vehicles as they cross a magnetic field sensor may exhibit known or expected magnetic field signatures as the vehicle crosses the sensor 400. In one embodiment, a user enters the make, model and year of the vehicle in order to obtain a known or expected magnetic field signature. Such a signature may be subtracted from the results obtained from road mounted sensor 400 and provide a display and location of a suspected magnetic field.

Figure 5:
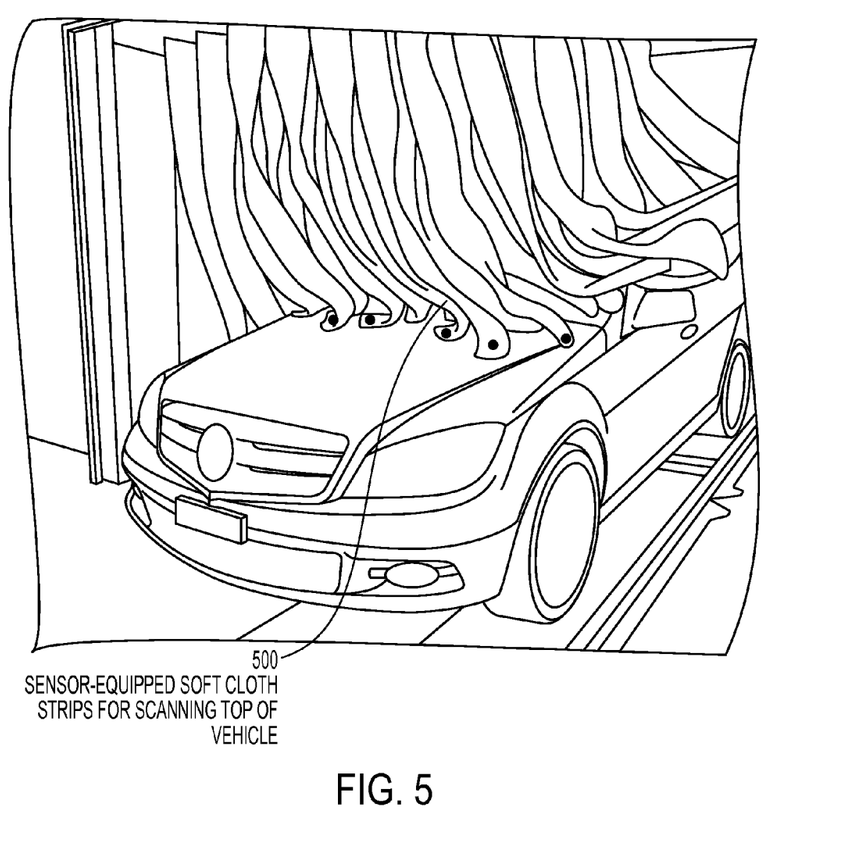
FIG. 5 represents a line drawing of a vehicle passing through a plurality of magnetic field sensor-equipped soft cloth strips to wipe over the top of a vehicle and, in a similar manner to that of the embodiment of FIG. 4, known magnetic field signatures may be subtracted from sensed signatures at predetermined locations and a display show a magnetic field of potential concern.

Referring to FIG. 5, there is depicted an embodiment of a vehicle roof inspection sensor system comprising a linear plurality of flexible strips, not unlike that found in a car wash. The flexible strips contain sensors at the ends such as Hall-effect sensors for scanning a vehicle from a frame, doorway, or interior space. Again, preferably two axis Hall-effect sensors are used for each flexible strip. The depicted vehicle drives under this frame containing the flexible cloth strips and sensors. Embedded on the ends of the flexible strips are, for example, two axis Hall-effect magnetic field sensors that can detect the presence of a magnetically affixed explosive, location finder or other device as the vehicle passes through the frame, thus allowing the sensors to come into contact as it brushes through these flexible strips. As with the embodiment of FIG. 4, a known vehicle signature can be retrieved from memory for comparison with a sensed magnetic field signature and suspected areas of the vehicle may be identified.

An important factor in using hidden detectors for detection of magnetically affixed devices is secrecy of the security inspections (for example, per FIGS. 4 and 5 or a combination thereof). Hidden surveillance increases the chance of detecting these explosive and tracking devices. By not making the surveillance methods obvious, the detection of careless or sloppy affixed devices by potential terrorists may have a higher probability of success. Complete screening may be done on large numbers of vehicles passing through public and private areas, over border crossings, toll booths on interstate highways or at building entrances.

It is contemplated and within the scope of this disclosure that data from the detectors, location, time, and/or video images of vehicles being inspected may be gathered, transmitted and stored for future reference by police authorities, the military, and/or government anti-terrorist agents. Real time correlation of sensor data location, time, and/or video images may also be useful for tracking specific incidents, crisis situations and identification of security threats. The sensor information may be sorted into bundles of data, types of data, attributes of data, etc.

Any of the aforementioned detection devices may be located at, by way of example, and not intending to be limiting: loading docks, ferry boat docks and ramps, bus terminals, air ventilation ducts, building entrances, parking garage access gates, mechanical access tunnel entrances, moving sidewalks, elevators, escalators; ingress and egress points of buildings, trains, subways, airports, buses and bus stations, etc.

Figure 6:
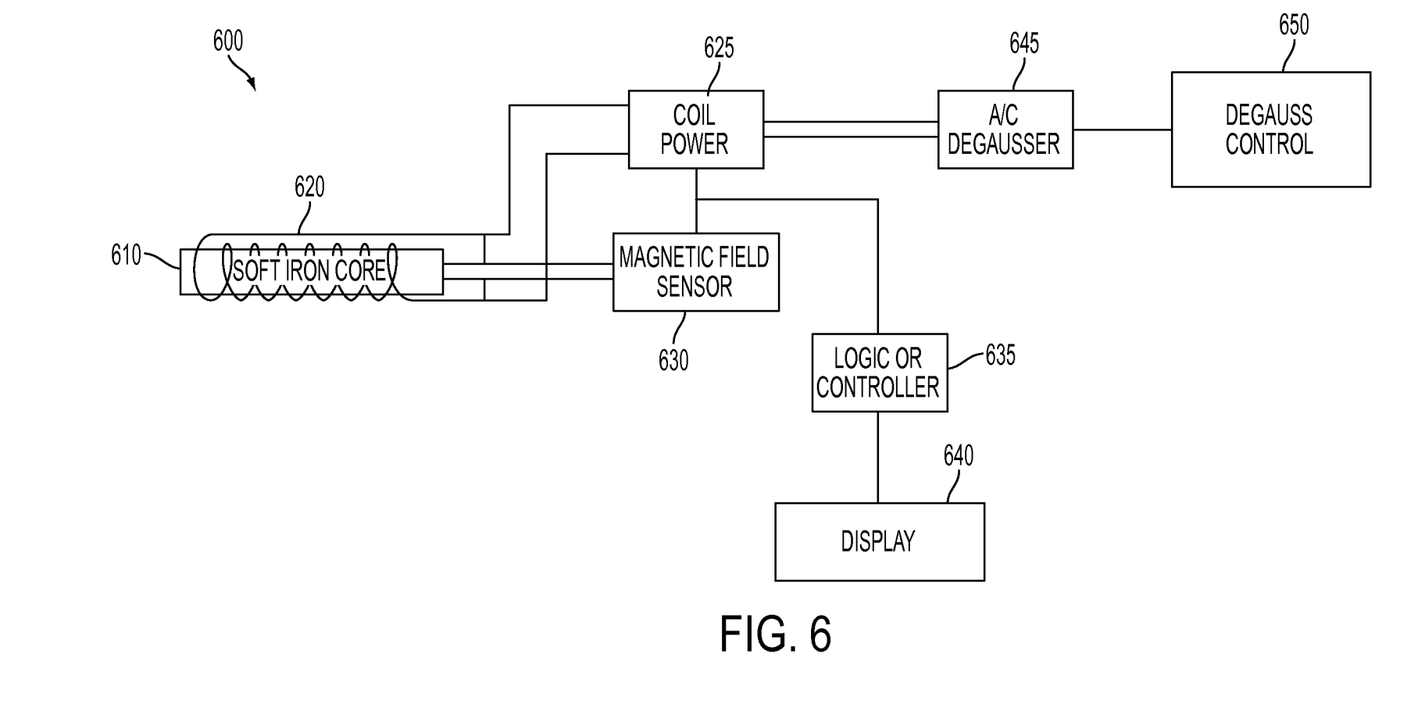
FIG. 6 represents a soft iron core magnetic field sensor which is initially degaussed via a short duration A/C voltage through a coil such that the soft iron core may become magnetized in the presence of a magnetic field and detected via the a winding at magnetic field sensor 630; a display or LED's may be lit to show the detected magnetic field.

Referring to FIG. 6, there is shown a block schematic diagram on a soft iron core magnetic field sensor for use in detecting magnetic fields produced by, for example, sticky IED's, containers and location finders. Sensor circuit 600 represents a soft iron core magnetic field sensor which is initially degaussed via a short duration A/C voltage produced via A/C degausser 645 and is controlled by degauss control 650, for example, each time a field is detected and soft iron core 610 magnetized from coming into proximity to, for example, a permanent magnet. The A/C degaussing is performed through a coil 620 which has two purposes, first, degaussing and secondly, detecting a magnetic field of suspect origin. In other words, the closer soft iron core 610 may become in proximity to a magnetic field by the square of the distance, core 610 may become magnetized in the presence of the magnetic field. The magnetic field may be detected via the winding 620 at magnetic field sensor 630. Magnetic field sensor 630 reports to logic circuitry or controller 635 which, in turn may actuate a display 640 or LED's may be lit to show the detected magnetic field.

An alternative embodiment may comprise a square or other shaped core 610 that may be configured to receive a first winding 620 as shown so that the polar positions of the magnet are left and right, north and south. A second winding may be wound over or through the first winding 610 so as to be wound at 90 degrees or orthogonal to the first winding 610. Core 610 may be magnetized to have magnetic poles facing up and down. If the core 610 is magnetized up and down and winding 620 is used to detect the magnetic field, it may fail to detect the orthogonal magnetic field, but the second winding will detect it. Consequently, in this embodiment, both the first and second windings are used to degauss the core 610 so that it may be magnetized either left to right or up and down. The first and second windings then will detect either polarized orthogonal magnetic field caused in core 610 by approaching, for example, a permanent magnet of a sticky device.

Figure 7:
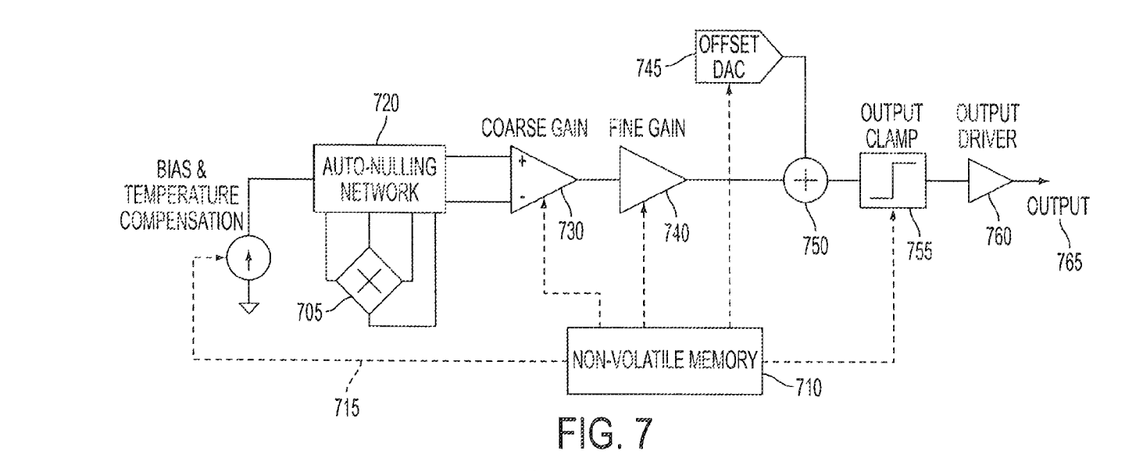
FIG. 7 represents an electrical circuit block diagram of a linear Hall-effect sensor 705 with coarse and fine grain tuning as well as bias and temperature compensation for detecting a magnetic field.

FIG. 7 represents an electrical circuit block diagram of a linear Hall-effect sensor 705 with coarse and fine grain tuning as well as bias and temperature compensation for detecting a magnetic field. Hall-effect sensor 705 may be linear or non-linear in nature but operates at a predetermined level of field strength measured in gauss and preferably comprises at least a two axis sensor. The output of sensor 705 may be provided to anti-nulling network 720 to compensate for ranges in actuation of switch 705. For example, coarse grain amplifier 730 may provide a coarse grain setting for switch 705 actuation and fine grain amplifier 730 may provide a finer grain setting for actuating switch 705 in the presence of a magnetic field. An offset digital to analog converter may provide a constant offset depending on, for example, known characteristics of a vehicle to be measured that may be offset from detected readings at adder 750. The output of adder 750 may be clamped at clamper 755 and the output driver 760 produce an analog output for processing as will be described in conjunction with FIG. 10. A non-volatile memory may be loaded with predetermined bias levels and temperature characteristics of magnets to be detected and characteristics of the particular sensor 705 used. In this manner, non-volatile memory 710 may provide a clamping output to clamp 755, an offset to offset DAC 745 and a bias and temperature compensation value to sensor 705.

Figure 8:
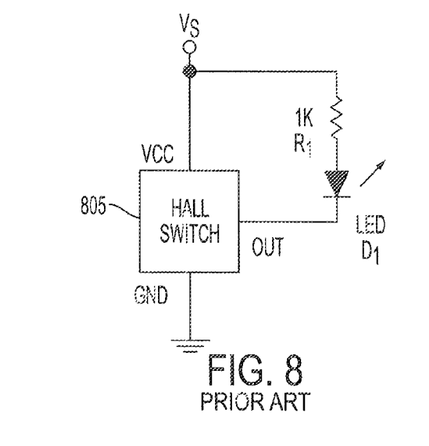

FIG. 8 represents a simple diode circuit for use with the circuit of FIG. 7 whereby the Hall-effect sensor 705 is now represented as Hall switch 805 for operating, for example, a light emitting diode $D_1$ to signal the presence of a magnetic field when the switch 805 is switched on. A 1 k ohm resistor $R_1$ is shown by way of example only and is not intended to be limiting. The resistance value, if any, is determined by the current needed to light diode $D_1$ and the characteristic output of switch 805.

Figure 9:
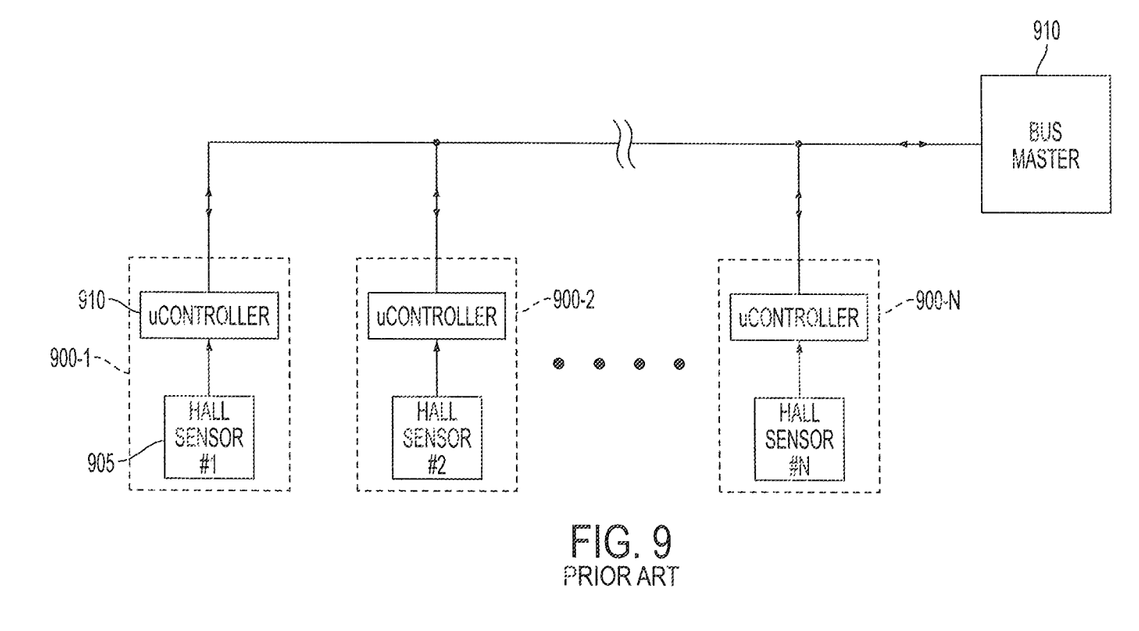
FIG. 9 represents a plurality of Hall-effect sensors per FIG. 7 connected by a bus and each having a microcontroller where the sensors may trigger at different values of magnetic field strength in gauss in order to detect a range of different magnetic fields and magnets, for example, ceramic and AlNiCo magnets among others.
Figure 10:
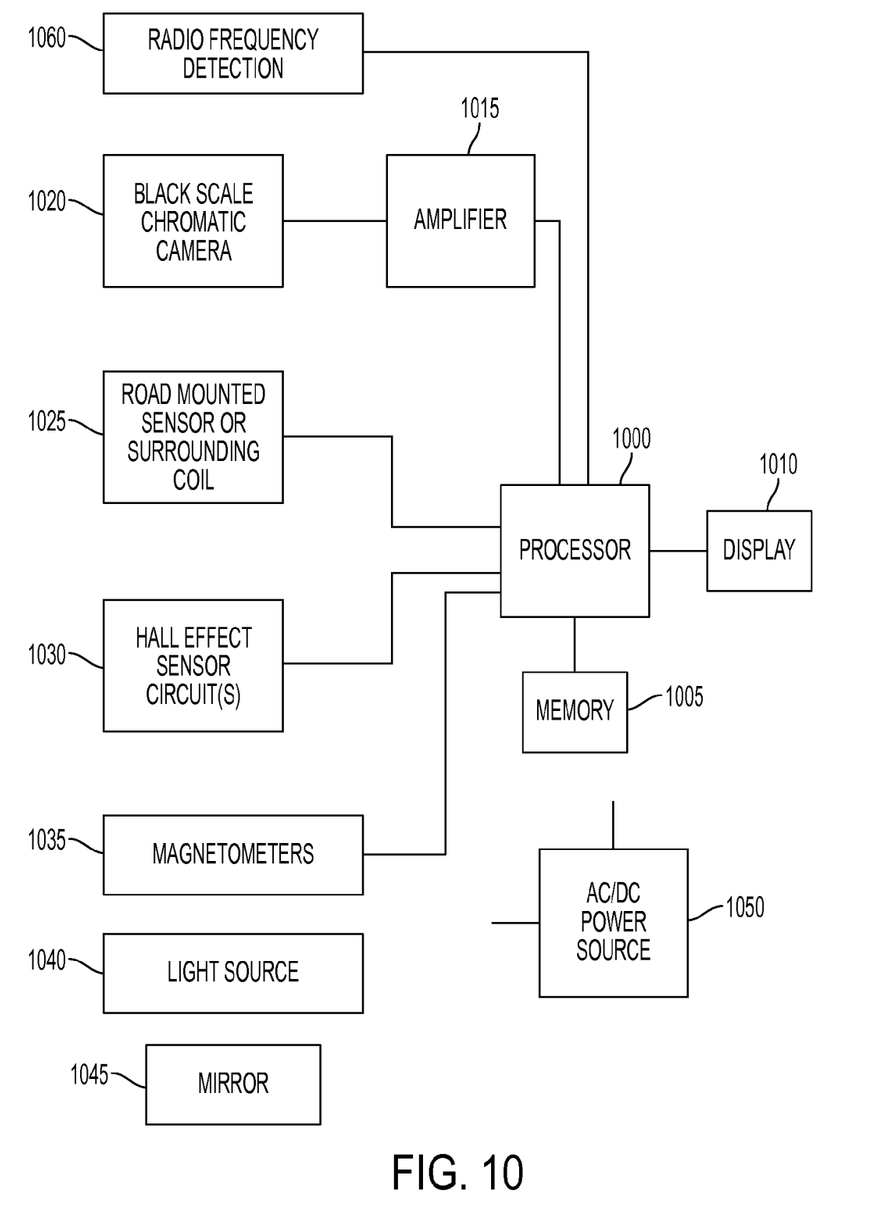

FIG. 9 represents a plurality of Hall-effect sensors per FIG. 7 which may be used with the LED displays of FIG. 8. The sensor circuit is connected by a bus to bus master 910. Each Hall sensor circuit 900-1 to 900-N may comprise a sensor 905 and associated microcontroller 910. The sensors 905 may trigger at different values of magnetic field strength in gauss in order to detect a range of different magnetic fields and magnets, for example, ceramic and AlNiCo magnets among others. For example, a typical remnant induction or flux density B present in a closed ring in a saturated state for a typical ceramic magnetic may be 3850 gauss. For an AlNiCo magnet, a range in B may be from 8200 to 12,800 gauss and for NdFeB up to 13,500 gauss. Hall-effect sensors are on/off binary devices operative at a relatively high sensor on point and to turn off at a relatively low level of gauss. Magnetic field strength diminishes with the square of the distance. So the closer any magnetic field detector is to a magnet, the more likely the detector will turn on. Temperature also impacts both the residual level of gauss in a permanent magnet and also impacts the characteristics of the field detector. Consequently, the circuit of FIG. 7 advantageously compensates for temperature and, when formed into a an array of different sensors of varying sensitivity, the circuit of FIG. 9 when utilized with the circuits of FIGS. 7 and 8 (to display an output) may provide identification of magnetic field strength, magnet type and size. Forensically, it may be possible to reconstruct a magnet from a discovered fragment and even, in combination with data of its alloy mixture, determine the source of its manufacture of the magnet.

FIG. 10 represents a schematic block diagram of a magnetic field sensor system having a plurality of means for detecting a magnetic field. These magnetic field sensors may include but are not limited to radio frequency detection 1060 for detecting transmissions to/from a sticky device. Further, for example, a black scale or other chromatic camera 1020 may detect and amplify via amplifier 1015 color distinctions in a typically black vehicle undercarriage. These color distinctions may indicate the presence of a sticky device. The input from the camera is fed to processor 1000 which receives inputs from, for example, a road mounted sensor or surrounding coil 1025 similar to that depicted in FIG. 4, the camera 1020, RF detector 1060, the soft cloth strips for the top per FIG. 5, Hall-effect sensors 1030 per FIGS. 7-9, soft iron core sensors per FIG. 6, known magnetometers, a light source, if required, for the camera 1020 and a typical mirror per FIG. 1 or 2. Processor 1000 may maintain known vehicle magnetic signatures in memory 1005. Processor 1000 may receive data, process the data via non-volatile memory signatures and inputs for make, model and year of vehicle and display an output indicating a possible magnetic field of potential concern on a display 1010. An AC/DC power source 1050 provides power to any device requiring power, for example, AC degaussing power for degaussing a soft iron core sensor per FIG. 6 or DC power for Hall-effect sensor circuits and diodes and the like. Also shown are a conventional mirror 1045 and light source for visual or camera inspection.

While embodiments of this disclosure have been depicted, described, and are defined by reference to example embodiments of the disclosure, such references do not imply a limitation on the disclosure, and no such limitation is to be inferred. All patents referenced herein and all articles and textbooks shall be deemed to be incorporated herein as to their entirety. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

REFERENCES

Ernesto Londoño. 2008. "Use of 'Sticky IEDs' Rising in Iraq: Magnetized Devices Cling to Undersides of Vehicles," Washington Post Foreign Service, Thursday, Oct. 9, 2008.

Matthew P. H. O'Hara. 2009. "Detecting Improvised Explosive Devices in Urban Areas," US Navy, Wednesday, Apr. 1, 2009.

What is claimed is:

1. A mirror assembly comprising a magnetic field sensor for detecting a magnetic field of a sticky device, the sticky device configured to adhere to a portion of a vehicle, the handheld mirror assembly adapted to be handheld and comprising the magnetic field sensor, the mirror assembly comprising     a pole having a mirror affixed to one end at an angle to the pole, the mirror reflecting light received from above toward the other end of the pole, the other end of the pole for providing a means for hand holding the pole and having a display attached thereto;

a Hall-effect sensor coupled to the display for sensing the presence of a magnetic field of a sticky device when in proximity of the sticky device, the Hall-effect sensor imbedded behind the center of the mirror, the display indicating the presence of a suspect magnetic field proximate to the mirror and the Hall-effect sensor and     a power supply for powering the sensor and display.

2. The mirror assembly according to claim 1 comprising an array of Hall-effect sensors embedded behind the mirror and associated display elements of the display such that an outline of a suspect magnetic field may be displayed upon an actuation of a portion of the array of Hall-effect sensors.

3. The mirror assembly according to claim 1, the mirror to which the Hall-effect sensor is mounted being circular, the mirror for reflecting a vehicle portion toward the other end of the pole simultaneously with magnetic field sensing.

4. The mirror assembly according to claim 1 funned as a rectangular array of at least four Hall-effect sensors for mounting at the center of the mirror, the pole being adapted for holding the mirror with an imbedded rectangular array across a roof of a vehicle and for locating a sticky device on the vehicle roof.

5. The mirror assembly according to claim 4 further comprising a memory for storing a vehicle magnetic field signature according to make, model and year of manufacture of the vehicle,     a processor for distinguishing between a stored magnetic field signature for identifying the vehicle and magnetic field data for a suspect magnetic field, and     a display for indicating the suspect magnetic field of the sticky device as distinguished from the vehicle.

6. The band-held mirror assembly of claim 5 further comprising a radio frequency detection device for detecting transmissions to the sticky device.

7. The hand-held mirror assembly of claim 5 further comprising one of a black scale and chromatic camera for detecting color distinctions in a typically black vehicle undercarriage.

8. The mirror assembly according to claim 1, the Hall-effect sensor comprising at least a two axis sensor, the axes being at a predetermined angle to one another.

9. The hand-held mirror assembly of claim 1 further comprising a light for use with the mirror, the light being attached to the pole at the other end.

10. The hand-held mirror assembly of claim 1 wherein the Hall-effect sensor comprises one of a two-axis sensor and a sensor with structures at 90° rotation to one another on a single die.

11. A vehicle roof inspection system comprising a horizontal portion of a frame, the frame having a plurality of flexible strips hanging from the horizontal portion in a line, each flexible strip containing a Hall-effect sensor at the end of the strip adapted for scanning a roof of a vehicle passing through the frame, the Hall-effect sensors for sensing a magnetic field of the vehicle roof as the vehicle passes through the frame, a known vehicle signature being retrieved from processor memory for comparison with the sensed magnetic field to determine the presence of a suspect magnetic field on the vehicle roof indicative of a presence of a sticky device.

* * * * *